US005260722A

United States Patent [19]

Blanding

[11] Patent Number: 5,260,722
[45] Date of Patent: Nov. 9, 1993

[54] METHOD AND APPARATUS FOR ADVANCING A CARRIAGE BY FLUID DISPLACEMENT

[75] Inventor: Douglass L. Blanding, Rochester, N.Y.

[73] Assignee: Eastman Kodak Company, Rochester, N.Y.

[21] Appl. No.: 785,970

[22] Filed: Oct. 31, 1991

[51] Int. Cl.⁵ ............................................. G01D 15/16
[52] U.S. Cl. .................................. 346/139 R; 60/533; 60/537; 60/571
[58] Field of Search ................... 355/233, 235, 43, 77; 346/108, 160, 139 R; 269/58, 73; 60/533, 534, 537, 539, 567, 571, 594

[56] References Cited

U.S. PATENT DOCUMENTS 3,737,221  6/1973  Roselli ........................... 355/212 X
4,307,959  12/1981  Janssen ........................... 355/233 X
5,093,685  3/1992  Blanding ............................. 355/43

Primary Examiner—A. T. Grimley
Assistant Examiner—William J. Royer
Attorney, Agent, or Firm—Robert L. Randall

[57] ABSTRACT

Methods of and apparatus for advancing a carriage utilize a displacement pump for displacing a selected quantity of fluid. The displacement pump is driven continuously by a motor to provide a series of fluid displacements which are accumulated in a hydraulic cylinder. A ram projecting from the hydraulic cylinder is coupled to the carriage and is advanced stepwise as the individual fluid displacements are accumulated in the hydraulic cylinder. The method and apparatus is especially useful for minimizing banding effects when advancing a carriage which supports a scanning device used in laser printers.

10 Claims, 3 Drawing Sheets

METHOD AND APPARATUS FOR ADVANCING A CARRIAGE BY FLUID DISPLACEMENT

BACKGROUND OF THE INVENTION

1. Field of the Invention

The present invention relates to methods of and apparatus for incrementally advancing a carriage when conducting a raster scan. More particularly, the instant invention relates to methods of and apparatus for incrementally advancing a carriage which is used, for example, to provide relative movement between a recording device and receiving medium in a raster scan system.

2. State of the Prior Art

Laser printers include means for moving a scan head after each line is recorded on a recording medium. In a known apparatus, a lead screw is used to advance a carriage supporting the scan head in the "slow scan" direction. A problem in using lead screws is that artifacts may occur as a result of very minute variations in lead screw pitch. These artifacts can appear as repetitive patterns, or "banding" in the image produced on the recording medium. The eye is extremely sensitive to periodic variations in density of an image, especially in areas which are nominally of uniform tone. In order to achieve band-free images in scanner apparatus which utilize lead screws, extremely high precision lead screws are necessary wherein the lead screws are ground and lapped to perfection. In addition, the lead screws themselves are driven by high precision motors. Accordingly, minimizing banding is too expensive for many applications.

Other techniques, such as those disclosed by U.S. Pat. Nos. 4,608,578 and 4,505,578 disclose utilizing a hydraulic cylinder to control the movement of a carriage on which a photosensitive medium or scanning mechanism is placed. In each of these patents, a braked, gravity transport is provided for moving a carriage. The carriage is propelled by a falling mass which works against a piston that is supported in a cylinder containing hydraulic fluid. A valve limits the flow of hydraulic fluid out of the cylinder so that the fall of the mass, and hence the carriage, is braked to a uniform velocity. The velocity of the carriage is controlled by controlling the rate of fluid flow through the valve. A difficulty with this device for many applications is that it is very difficult to obtain a uniform velocity throughout the full extent of carriage movement. The carriage velocity, and therefore its precise position at any specified time, depends upon a delicate balance between the force of gravity, the hydraulic braking force, and the force of friction between the moving parts, such as the carriage on its rails, or the hydraulic seals on the cylinder bore, etc. Since friction is notoriously variable, the carriage velocity can be expected to be variable. Further problems with this apparatus are that the apparatus is not compact and the falling mass must necessarily be oriented vertically.

U.S. Pat. No. 4,433,346 discloses a scanning mechanism utilizing a linear motor; however, the linear motor is not disclosed as being configured in a manner to eliminate banding. U.S. Pat. No. 4,562,349 utilizes hydraulic cylinders to advance a support arm to which a scanning head is attached; however, again, the arrangement is not configured to minimize banding.

U.S. Pat. No. 3,344,526 is directed to an apparatus for minimizing periodic errors when ruling diffraction gratings, wherein lines are engraved on a reflector blank. The blank is advanced by a hydraulic ram as discrete volumes of hydraulic fluid are accumulated in a hydraulic cylinder containing the ram to extend the ram therefrom in a series of discrete steps. This approach has yet to be used in or considered for raster printing, rather the aforementioned approaches with their attendant disadvantages have been employed or considered.

SUMMARY OF THE INVENTION

It is an object of the present invention to overcome the problems of the prior art discussed above and to provide new and improved apparatus for and methods of incrementally advancing a carriage which, for example, may be used to step a scan head in a raster printer.

In view of the aforementioned object and other objects, the instant invention contemplates methods of and apparatus for advancing a carriage in a series of discrete steps by utilizing a motor-driven displacement pump for displacing a selected quantity of fluid, accumulating the fluid and advancing the carriage a discrete distance for each selected quantity of fluid displaced.

The method and apparatus is of particular interest in raster scanning devices such as raster printers where it is desirable to minimize or eliminate the deleterious effects of banding on images generated as a scanning device is advanced.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF THE PREFERRED EMBODIMENTS

The present invention is described herein with reference to a printer. However, the invention is also applicable to an input scanner which is used to convert an image into an electrical signal. The term "receiving medium," as used herein is intended to include any medium on which an image can be formed as well as any medium which has an image formed thereon such as, for example, a photographic film, a photoconductor, or a document.

Figure 1:
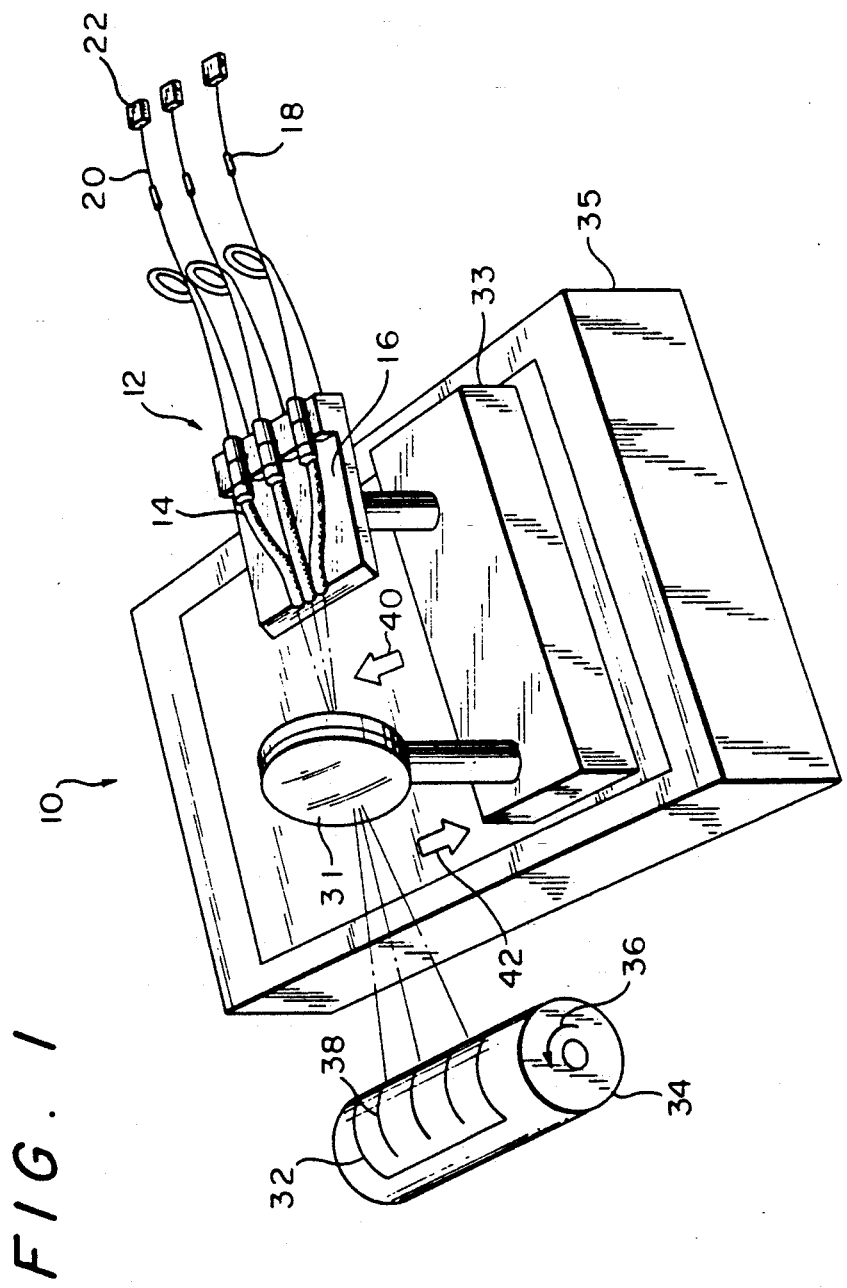
FIG. 1 is a perspective view of a raster printer of the type utilizing the present invention.

With reference to FIG. 1, there is shown a printer 10 of a type in which apparatus of the present invention can be used to effect relative movement between a receiving medium and a scan head. The printer 10 includes a scan head in the form of a fiber optic array 12. The fiber optic array 12 is comprised of three operative elements, each of which includes an optical fiber 14 supported on a substrate 16. Each optical fiber 14 is connected by means of an optical fiber connector 18 to another fiber 20. Each of the optical fibers 20 is connected to a light source 22 which may be a laser or a light-emitting diode. Each light source 22 in array 12 can be modulated according to an information signal in a well-known manner. Light from optical fibers 14 is focused on a receiving medium 32 by a lens 31. Both lens 31 and fiber optic array 12 are mounted on a carriage 33 which is supported for linear movement on a frame 35. In FIG. 1, there are three operative elements in the array 12; however, the number could be more or less than three. Receiving medium 32 is supported on a drum 34 which is driven to rotate in the direction of arrow 36. The receiving medium 32 can be, for example, photographic film. As drum 34 is rotated, a set of raster lines 38 are generated on the receiving medium 32, and at the completion of each set of raster lines 38, the carriage 33 is advanced a constant distance in the direction of arrow 40. Successive sets of raster lines 38 are traced on receiving medium 32 until a desired image has been completed.

Figure 2:
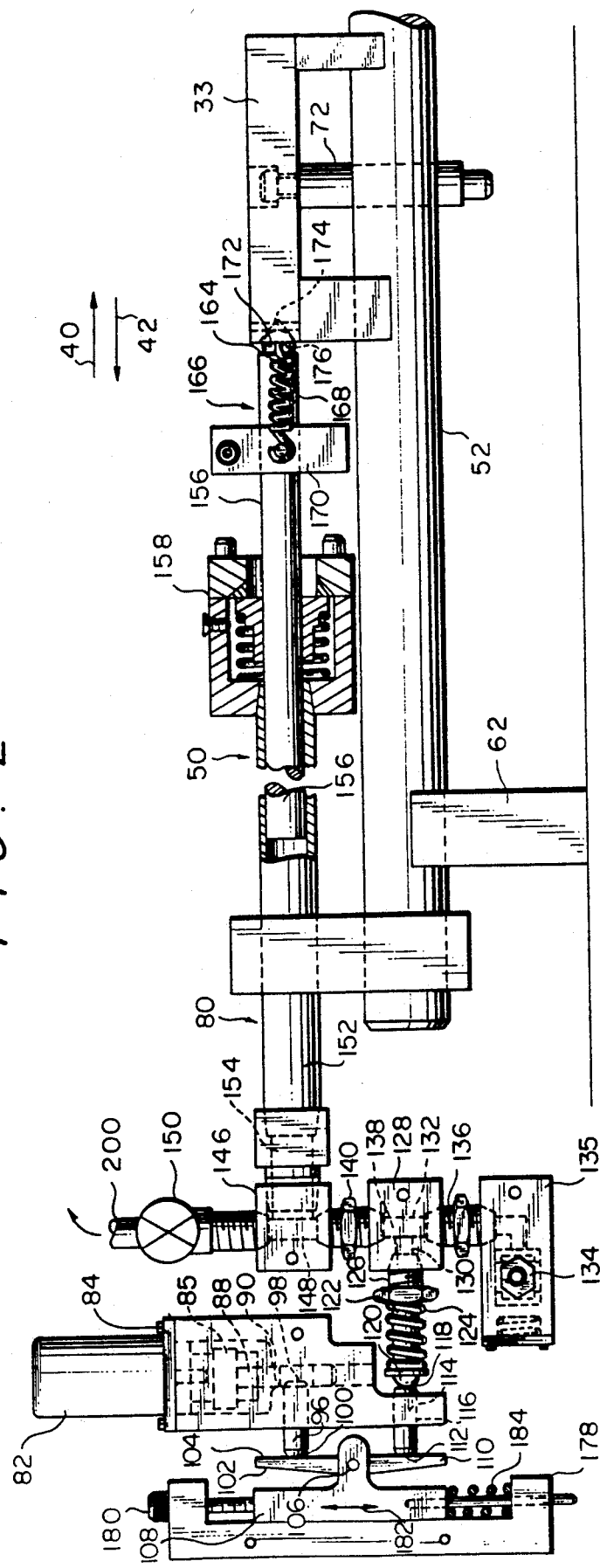
FIG. 2 is a side view of an apparatus configured in accordance with the principles of the instant invention for advancing a carriage used in the raster printer of FIG. 1.
Figure 3:
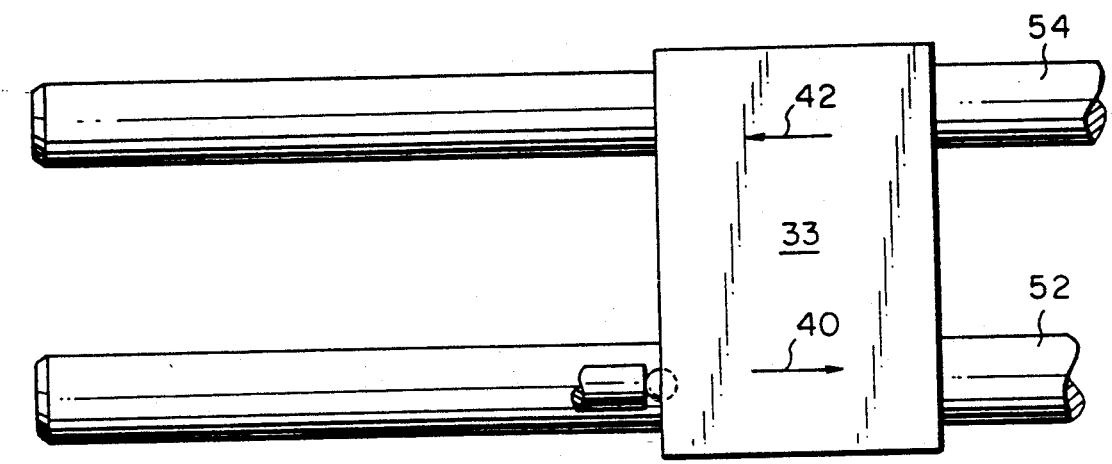
FIG. 3 is a top view of the apparatus of FIG. 2.
Figure 4:
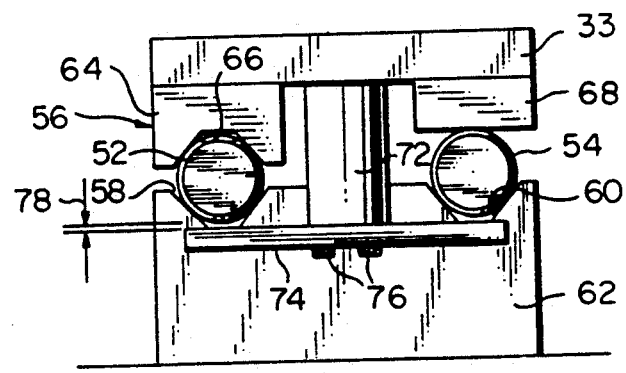
FIG. 4 is an end view of the apparatus of FIG. 3.

Referring now to FIGS. 2 and 3, there is shown an apparatus, designated generally by the numeral 50, configured in accordance with the principles of the instant invention for practicing the method of the instant invention. The carriage 33 is supported on parallel rails 52 and 54 by a block arrangement, designated generally by the numeral 56. The rails themselves are supported in grooves 58 and 60 of mounting blocks 62 (only one of which is shown) to extend parallel with respect to one another. The block arrangement 56 comprises two inverted V-blocks 64 having grooves 66 therein which rest on top of rail 52 and a block 68 which rests on top of rail 54. Together these blocks constrain the carriage 33 to sliding movement only, in the direction of arrow 40. A post 72 projects down from the carriage 33 to which is attached a bar 74 by screws 76. There is a slight gap 78 between the bottoms of the rails 52 and 54 and the bar 74 so that the carriage 33 may slide on the rails to advance the fiber optic array 12.

In accordance with the principles of the instant invention, the carriage 33 is advanced in the direction of the arrow 40 by a hydraulic pumping system, designated generally by the numeral 80, which is powered by an electric motor 82 secured to a frame 84. The carriage 33 is returned in the direction of arrow 42 to its starting position by any conventional means since raster scanning does not, in the illustrated embodiment, occur during return motion. This return may be effected by a separate hydraulic return (not shown) in which a piston (not shown) is pushed by a hydraulic cylinder to extend in the direction of the arrow 42. It is within the s of this invention to intermittently advance the carriage 33 in the direction of arrow 42 by driving the carriage 33 with a hydraulic pumping system similar to the system 80 if, for some reason, conducting raster scanning in both directions is being practiced.

The electric motor 82 is connected by a coupling 85 to an output shaft 88. The output shaft 88, which has a cam surface 90 thereon, is rotatably retained in frame 84. A cam follower in the form of an input pin 96 is slidably retained in the frame 84 and has one end 98 in abutment with the cam 90 and another end 100 in abutment with a first arm 102 of a rocker arm 104. The rocker arm 104 is supported by a pivot 106 on a supporting block 108 and has a second arm 110 which engages a first end 112 of an output pin 114 which is supported by slidable movement in a bore 116 through the mounting frame 84. A second end 118 of the output pin 114 abuts the free end 120 of a piston 122 which is biased by a spring 124 into abutment with the second end of the output pin. As the cam 90 is driven to rotate by the motor 82, input pin 96 reciprocates, causing the rocker arm 104 to rock about the pivot 106 and to reciprocate the output pin 114 against the bias of the spring 124 which holds piston 122 in engagement with the output pin.

The piston 122 reciprocates in a cylinder 126 which communicates with a tee 128 via a first passageway 130. The tee 128 has hydraulic fluid constantly supplied thereto through a second passageway 132 which communicates with the first passageway 130. The second passageway 132 is supplied by an inlet port 134 of a filter 135 connected to a reservoir of fluid (not shown) and in communication with the second passageway 132 through a check valve 136. A third passageway 138 is connected at one end to the second passageway 132 and first passageway 130 and at the other end to check valve 140. In essence, the tee 128 with its passageways and piston 126 cooperate to provide a positive displacement pump for the hydraulic fluid.

The hydraulic fluid is pumped each time the piston 122 is pushed into the cylinder 126 so as to open the check valve 140 and close the check valve 136. The discrete quantity of fluid thus displaced flows into a tee 146 through passageway 148 where it is retained by a closed valve 150. The passageway 148 is connected to a hydraulic cylinder 152 by passageway 154. Each time a discrete quantity of hydraulic fluid is displaced by the piston 122, it accumulates in the hydraulic cylinder 152 and displaces a ram 156 a selected distance in the direction of arrow 40.

The ram 156 passes through a sealing device 158. Positioned adjacent the end 164 of the ram 156 is a coupling designated generally by the numeral 166. The coupling 166 includes a spring 168 secured at one end to an anchor 170 mounted on the ram 156 and secured at its other end to the carriage 33. Disposed between the end 164 of the ram 156 and the carriage 33 is a spherical bearing 172 which is received in a conical indentation 174 in the carriage 33 and a conical indentation 176 in the end of the ram.

In order to finely adjust the stroke of the piston 122 so as to adjust the increment of advance of the ram 156 as each successive quantity of liquid is injected into hydraulic cylinder 152, the block 108 supporting rocker arm 104 is mounted in a frame 178 by a screw 180 threaded through the block and journalled in the frame so as to selectively move the block up and down in the direction of arrow 182. A coil spring 184 is disposed between the block 108 and frame 178 to retain the block in the position selected by the screw. Movement of the block 108 shifts pivot 106 with respect to input pin 96 and output pin 114 so that the travel of the piston 122 may be increased or decreased a selected amount by turning screw 180 in order to determine the amount of hydraulic fluid displaced with each stroke of the piston.

When the carriage 33 has reached the end of its travel in the direction of arrow 40, the valve 150 is opened by a controller (not shown) to allow fluid accumulated in the hydraulic cylinder 152 to be displaced as the ram 156 is returned in the direction of arrow 42. The fluid displaced through valve 150 is returned by line 200 back to the reservoir (not shown) which supplies hydraulic fluid to the inlet port 134 of the filter 135. As has been previously stated, the carriage 33 may be returned in a conventional manner by a hydraulic drive (not shown) or other type of drive (not shown) which is uncoupled from the carriage 33 when the hydraulic pumping system 80 advances the carriage in the direction of arrow 40 during the raster scan.

By utilizing the aforedescribed hydraulic pumping arrangement, banding caused by periodic variations of step size is reduced to infinitesimal levels by minimizing the magnitude of periodic errors. Each increment or step is identical to every other step. Consequently, there are no periodic occurrences which repeat other than at the step rate. The step size is equal to the line pitch of the image.

After sufficient steps are taken, an entire image is written in one color on the recording medium 32 (FIG. 1). The valve 150 is then opened and the ram 156 returned to its original starting position. The valve 150 is then closed and a second color is written on the recording medium 32 over the first color in exactly the same manner. Subsequently, a third color is written over the first two colors to produce a color image.

The diameter of the cylinder 152 is relatively large, whereas the flow from the pumping piston 122 is relatively small, resulting in relatively small displacements so as to achieve a very slow scan. The resulting image on the recording medium 32 is virtually free of banding defects because the only periodic occurrence in the drive is the rotation of the motor 82. However, since this periodic occurrence is made to correspond with a small distance along the scan direction, any banding associated with motor rotation is at a very high spacial frequency and is therefore not perceivable.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications cited above are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of intermittently advancing a carriage in a raster scanning system, the method comprising the steps of:

advancing stepwise a carriage supporting an exposure platen by accumulating a series of discrete volumes of displaced fluid in a hydraulic cylinder and advancing a ram disposed between the hydraulic cylinder and carriage one step each time a volume of displaced fluid is accumulated in the hydraulic cylinder, creating the volumes of displaced fluid continuously by operating a displacement pump with a continuously running electric motor, whereby banding effects in images produced by a raster scanner are minimized.

2. The method of claim 1, wherein a piston is reciprocated in the displacement pump to create the discrete volumes of displaced fluid.

3. The method of claim 2 further including the step of adjusting the length of the stroke of the piston to adjust the length of each step that the carriage advances.

4. Apparatus for advancing a carriage supporting a scanning device in a raster scanning system wherein the carriage is advanced in a series of discrete steps, the apparatus comprising:

a displacement pump for displacing a selected volume of fluid with each stroke;

a motor for operating the displacement pump continuously to provide a series of displaced selected volumes of fluid;

means for accumulating the displaced selected volumes of fluid as they are provided;

means connected to the carriage for advancing the carriage and being associated with the accumulating means for movement with respect thereto as the selected volumes of fluid accumulate in the accumulating means, whereby the carriage is incrementally advanced each time the displacement pump displaces a selected volume of fluid.

5. The apparatus of claim 4, wherein the motor is an electric motor which rotates an output shaft at a constant speed to drive the displacement pump by rotating a cam connected to the output shaft and to the displacement pump.

6. The apparatus of claim 5, wherein the cam drives a piston in the displacement pump through a coupling means disposed between the cam and the piston.

7. The apparatus of claim 6, wherein the coupling means includes means for adjusting the stroke of the piston in the displacement pump while the rise due to rotation of the cam remains constant.

8. The apparatus of claim 4, wherein the raster scanning system is a raster printer.

9. The apparatus of claim 4, wherein the capacity of the accumulating means is large with respect to the individual fluid displacements by the displacement pump.

10. The apparatus of claim 9, wherein the raster scanning system is a raster printer.

* * * * *